United States Patent [19]

Salmon, Jr.

[11] Patent Number: 5,042,950
[45] Date of Patent: Aug. 27, 1991

[54] APPARATUS AND METHOD FOR LASER BEAM DIAGNOSIS

[75] Inventor: Joseph T. Salmon, Jr., Livermore, Calif.

[73] Assignee: The United States of America as represented by the United States Department of Energy, Washington, D.C.

[21] Appl. No.: 526,757

[22] Filed: May 22, 1990

[51] Int. Cl.$^5$ .............................................. G01B 9/02
[52] U.S. Cl. .................................... 356/353; 356/345
[58] Field of Search ......................... 356/353, 345, 354

[56] References Cited

U.S. PATENT DOCUMENTS

| | | |
|---|---|---|
| 3,857,636 | 12/1974 | Angelbeck . |
| 4,744,659 | 5/1988 | Kitabayashi ..................... 356/353 |
| 4,760,537 | 6/1988 | Martin et al. . |

OTHER PUBLICATIONS

"Laser Beam Divergence Utilizing a Lateral Shearing Interferometer", Riley et al., Applied Optics, 10-1977, pp. 2753-2756.
Casasent, Spatial Light Modulators and Their Use in Optical Data Processing, SPIE, vol. 128, Effective Utilization of Optics in Radar Systems, pp. 56-67, 1977.
Grinberg et al., Liquid Crystal Electro-Optic Modulators for Optical Processing of Two-Dimensional Data, SPIE, vol. 128, Effective Utilization of Optics in Radar Systems, pp. 253-266, 1977.
Liu et al., Optical Data Processing Properties of a Liquid Crystal Television Spatial Light Modulator, Optics Letters, vol. 10, No. 12, pp. 635-637, Dec. 1985.
Morozumi et al., Latest Developments in Liquid Crystal Television Displays, Optical Engineering, vol. 23, No. 3, pp. 241-246, May/Jun. 1984.

*Primary Examiner*—Samuel Turner
*Attorney, Agent, or Firm*—James D. McFarland; L. E. Carnahan; William R. Moser

[57] ABSTRACT

An apparatus and method is disclosed for accurate, real time monitoring of the wavefront curvature of a coherent laser beam. Knowing the curvature, it can be quickly determined whether the laser beam is collimated, or focusing (converging), or de-focusing (diverging). The apparatus includes a lateral interferometer for forming an interference pattern of the laser beam to be diagnosed. The interference pattern is imaged to a spatial light modulator (SLM), whose output is a coherent laser beam having an image of the interference pattern impressed on it. The SLM output is focused to obtain the far-field diffraction pattern. A video camera, such as CCD, monitors the far-field diffraction pattern, and provides an electrical output indicative of the shape of the far-field pattern. Specifically, the far-field pattern comprises a central lobe and side lobes, whose relative positions are indicative of the radius of curvature of the beam. The video camera's electrical output may be provided to a computer which analyzes the data to determine the wavefront curvature of the laser beam.

20 Claims, 6 Drawing Sheets

APPARATUS AND METHOD FOR LASER BEAM DIAGNOSIS

The United States Government has rights in this invention pursuant to Contract No. W7405-ENG-48 between the United States Department of Energy and the University of California for the operation of Lawrence Livermore National Laboratory.

BACKGROUND OF THE INVENTION

1. Field of the Invention

The present invention relates to optical signal processing, and specifically to an apparatus and method for diagnosing a laser beam. More specifically, the present invention relates to an apparatus and method that continuously monitors the laser beam, measuring the radius of curvature of the wavefront, which indicates the extent to which the beam is focusing or de-focusing.

2. Description of Related Art

Beam diagnosis is an issue for many applications of laser technology. Many lasers output a beam with characteristics that may be considered less than perfect; a typical laser beam is far from a perfectly collimated gaussian beam with infinite temporal coherence. Furthermore, as the laser beam is processed or redirected with conventional optics, or as the beam is passed through any of a variety of optical components, its characteristics are often changed in a way that is difficult to diagnose. The components that affect the beam may include amplifiers, or optical components such as mirrors or lenses. Any slight curvature in these components may affect the radius of curvature of the wavefront; i.e., it may cause the beam to be converging or diverging.

A beam of light may be diagnosed according to the curvature of the beam's wavefront. A beam may be collimated, convergent, or divergent. A divergent beam is spreading out; it is "de-focusing". Like a flashlight beam its cross-section will continue to spread as it travels. This de-focusing effect can be seen by campers who shine their flashlight first on a nearby object such as a tent, and then on a faraway object such as a tree. When the light shines on the nearby tent, it has a high intensity and appears in a defined circle; however, the light on a distant tree is spread out and the light circle is not well defined. A flashlight beam is incoherent, which means the phase in a cross-section is random. Furthermore, the flashlight beam is not monochromatic; it consists of a broad band of wavelengths across the visible spectrum. In comparison, a laser beam is substantially monochromatic; it consists of a very small narrow range of wavelengths. Furthermore, a laser beam has a certain amount of spatial coherence, which refers to the alignment in phase between waves travelling side-by-side, viewed in a cross-section. A coherent laser beam can be conceptualized as a series of aligned wavefronts travelling in the direction of propagation of the beam.

A diverging laser beam may be easily produced with a concave lens. With respect to this lens, the diverging laser beam has wavefronts that appear to be convex. By comparison, a convergent beam has wavefronts that appear to be concave. A convergent beam will focus to a small point having a size that is equal to or greater than the diffraction limited size. An example of convergent beam is easily produced by a common magnifying glass. Many a child has found that a magnifying glass may be used to focus the sun's rays. At the focal point, the concentrated rays have enough intensity to burn paper, ants, or an unsuspecting friend.

If a laser beam is neither converging or diverging, then it is said to be collimated. For many laser applications, a collimated beam is highly desirable. The wavefronts in a collimated beam have no curvature, and are perpendicular to the direction of propagation. The radius of curvature is infinite, and the edges of the beam will remain parallel for a great distance. Beyond this great distance, the beam will show some diffraction related divergence.

As stated earlier, the curvature of the wavefronts may be straightforwardly changed by lenses such as convex lenses and concave lenses. Curvature may also be affected by other components in the beam path, such as mirrors, Q-switches and gain material. Any slight curvature in these components, or irregularity in the index or refraction may affect the wavefront's curvature; i.e., it may cause the beam to be converging or diverging. The effect may be multiplied as the beam goes through a number of components; a slight change in curvature at the beginning of a line of components may be translated to a very large change in curvature at the end of the line.

Additionally, wavefront curvature may be affected by the "self-focusing" effect. Particularly it is known that the intensity of the laser beam and the composition of the optical components may affect the curvature of the wavefront; many materials exhibit "self-focusing". A typical laser beam has an intensity profile that has a maximum intensity in the center. As the beam travels through an optical material such as a lens, the relatively high center intensity affects the index of refraction in the material's center to a greater extent than in the surrounding areas which are exposed to a smaller intensity. As a result of these differences in the index of refraction, the material itself causes an unintended focusing effect similar to a lens. This effect is termed "self-focusing". It is known that glass and other conventional laser materials such as dye solutions and crystals exhibit self-focusing. Self-focusing is a function of intensity, and may become uncontrolled. In general, self-focusing affects the radius of curvature of the wavefront in an unpredictable manner.

Many different applications exist for laser beams. Often, an accurate diagnosis of the radius of curvature can make a substantial difference in the success of the end process. If a laser beam can be characterized by its radius of curvature, then beam processing can be applied to produce a beam of the desired curvature. Thus, accurate diagnosis of the radius of curvature of a laser beam can be a useful tool.

For example, in the technology of isotope separation using lasers, laser beams from a number of lasers and amplifiers are combined and directed through a chamber containing vapor of the isotopes to be separated. A perfectly collimated beam is highly desirable and is very important to the success and efficiency of the LIS process. However, delivering a beam of this quality to the separation chamber is a difficult challenge due to the power of the laser beam and the extent of the optical network needed to direct the laser beam to the chamber. If the laser beam going into the chamber could be diagnosed accurately, the radius of curvature could be modified by conventional optical techniques, thereby to provide a laser beam to the chamber with the desired radius of curvature.

Methods have been developed for analyzing a laser beam to determine its curvature. In one method of diagnosing a laser beam, an interferometer such as a shear plate is positioned in the beam path, at an angle to the incoming beam. A typical shear plate comprises a plate of glass having the two opposed planar surfaces formed slightly non-parallel. A sufficiently coherent beam is partially reflected off the front surface, and partially reflected at a slightly different angle off the back surface of the shear plate. Where the two reflected beams combine, a set of interference fringes are created.

The contrast of the interference pattern is much affected by the amount of spatial coherence of the laser beam; a greater spatial coherence will produce sharper fringes. A lesser spatial coherence may still produce an interference pattern, but with less definition of the fringes. There are many sources of coherent laser radiation; lasers such as HeNe lasers, excimer lasers, or metal vapor lasers can produce laser radiation that is coherent to some degree. A well-controlled laser oscillator design can provide a high degree of spatial coherence, but generally such lasers are relatively expensive. Generally it is more cost effective to produce a beam of high spatial coherence by applying a laser beam with low spatial coherence to a conventional spatial filter. A typical spatial filter may include a focusing lens (microscopic objective), a pinhole, and another lens. The beam with low coherence is focused by the microscope objective on one side of the pinhole, and the other lens is positioned in the beam diverging from the microscope objective in order to collimate the beam.

In the technology of optical processing, coherence is generally divided into two types: spatial coherence and temporal coherence. Spatial coherence refers to the uniformity of a cross-section of the beam. A laser beam with high spatial coherence may exhibit a circular intensity profile that is Gaussian; i.e., the peak intensity is at the center of the circular cross-section, and the intensity drops off uniformly to the sides as a Gaussian curve. In this Gaussian cross-section, the electric fields are substantially in phase, thus producing a highly coherent cross-section. Temporal coherence refers to the variation in the beam over time, and is often measured in terms of length. One concept of temporal coherence of a laser beam is in terms of its monochromaticity; a beam that has zero bandwidth (a single wavelength) is completely monochromatic and will exhibit a very long, effectively infinite temporal coherence length. Such zero bandwidth beams are not the norm; real laser beams have a finite temporal coherence. However, temporal coherence is generally not a substantial limitation to creation of an interference pattern, because most interferometers such as shear plates, require a coherence length much smaller than the coherence length of most conventional lasers.

In observing an interference pattern, the shape of the interference fringes is a direct indication of the extent to which the beam is collimated. Shear plates are commonly used by a scientist to observe an interference pattern while physically adjusting the position of a lens in the beam path to provide a collimated beam. When the beam is substantially collimated, the scientist observes the interference pattern as a series of straight, parallel lines that are perpendicular to the propagation of the two beams combining to form an interference pattern. Divergence or convergence is observed as a rotation of the interference pattern, either clockwise or counterclockwise. A problem with this method is accuracy; the scientist will not be able to pinpoint the exact lens position at which the beam is collimated with high precision. In other words, he cannot detect a small amount of convergence or divergence. Furthermore, if he observes a tilting of the fringes in the interference pattern, he cannot accurately ascertain the radius of curvature.

To obtain a more accurate measurement of the radius of curvature of the beam, the interference pattern may be provided to a computer. In a conventional method of beam diagnosis, the interference pattern is monitored by a video camera. A typical video camera includes a conventional CCD (charge-coupled device), which observes the interference pattern as a matrix of pixels, and outputs an electrical signal indicative of the observed image. The image information is then digitized and provided to a computer which analyzes the beam. For example, the angle and degree of curvature of the interference fringes may be analyzed. One disadvantage of this method is the considerable amount of computer processing time required for an accurate analysis; computer analysis of the interference pattern cannot be considered a real time process. Furthermore, the resolution of the CCD is limited; digitizing introduces errors such an an aliasing error. Thus, computer analysis of the interference pattern is difficult and imprecise, and the resulting diagnosis may not be entirely accurate.

SUMMARY OF THE INVENTION

The present invention provides an apparatus and method that accurately, and in real time monitors the curvature of the wavefronts of a coherent laser beam. Knowing the curvature, it can be quickly determined whether the laser beam is collimated; (i.e., travelling parallel), whether it is focusing (converging), or defocusing (diverging).

The present invention comprises an apparatus for measuring the curvature or the radius of curvature of a laser beam. The apparatus includes a lateral shearing interferometer for forming an interference pattern of a cross-section of the laser beam to be diagnosed. The interference pattern is imaged to a spatial light modulator (SLM) so that the interference pattern is input to the SLM. The SLM modulates a second coherent laser beam with an image of the interference pattern. The SLM output is focused to obtain the far-field diffraction pattern, which comprises the spatial Fourier transform of the SLM output. The far-field diffraction pattern is monitored by a video camera, such as a CCD, that provides an electrical output indicative of the shape of the far-field pattern. Specifically, the shape of the far-field pattern comprises a central lobe and side lobes. The position of the side lobes with respect to the central lobe depends on the radius of curvature of the beam. The CCD's electrical output may be provided to an image processor and a computer which analyzes the data to precisely determine the radius of curvature of the laser beam.

In practice, the laser beam that is analyzed may not be the actual laser beam used in the process, but is a sample of that beam. The sample beam can be provided by a leak through a mirror positioned in the main beam. Preferably, the main beam (and therefore the sample beam) has high spatial coherence so that a sharp interference pattern can be formed.

An advantage of the present invention is that it can be operated as a real time process. It can accurately and quickly measure the radius of curvature of the beam, and provide the output in computer readable form. As a further advantage, it can be applied as feedback to another system that maintains a highly collimated beam by modifying the curvature of the beam.

This method of beam diagnosis may have application to Laser Isotope Separation (LIS), in order to ensure that the beam applied in the target chamber is well collimated. Diagnosis of the radius of curvature is also useful in many other laser applications, such as high power lasers.

DETAILED DESCRIPTION OF THE INVENTION

The present invention provides an apparatus for diagnosing a laser beam in real time. The method of diagnosis provides an easily readable, accurate indication of the wavefront curvature of the beam.

In the following description, the preferred embodiment is first described in general terms, with reference to the figures. Subsequent to the general description, a specific description describes more particular aspects, again with reference to the figures. Throughout the description and the figures, like parts are designated with like numerals.

GENERAL DESCRIPTION

Figure 1:
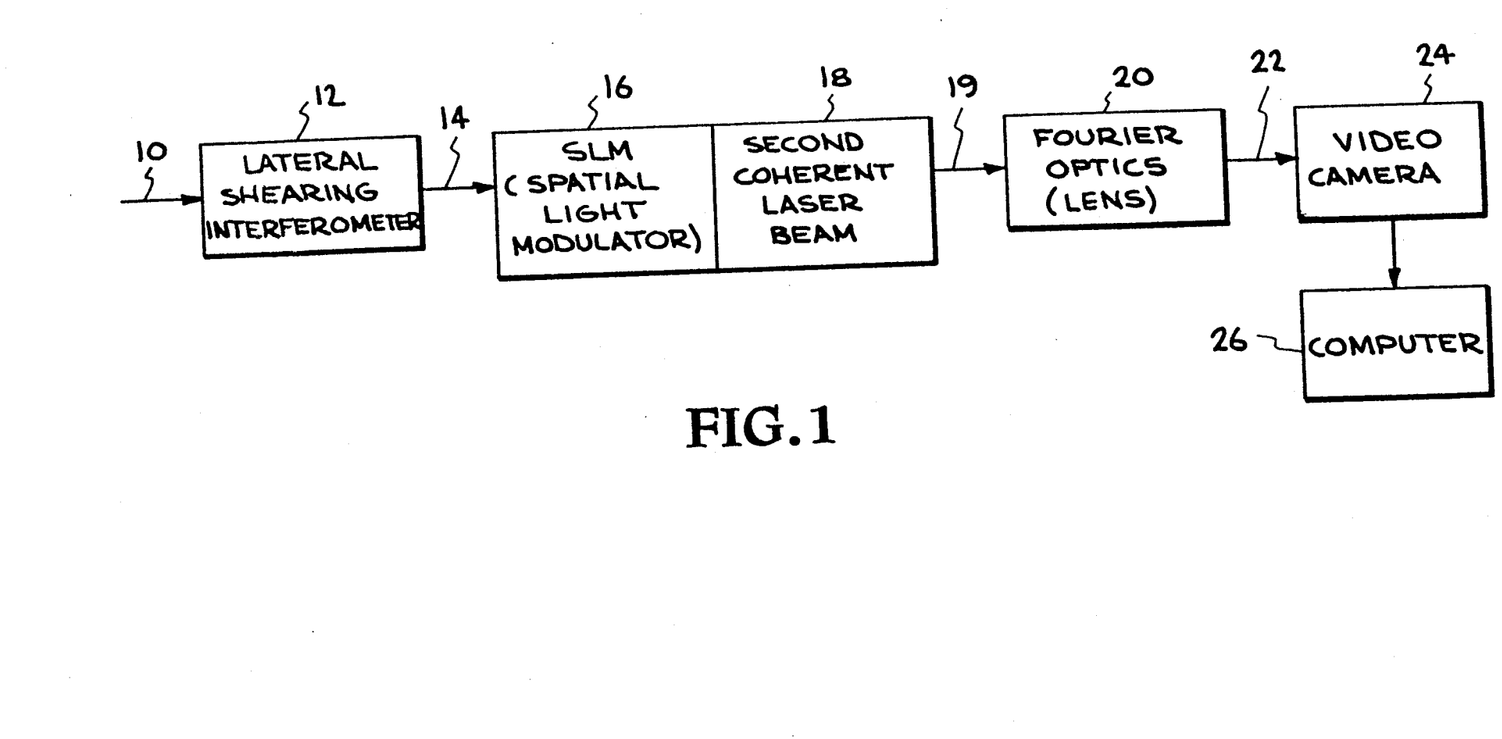
FIG. 1 illustrates an embodiment of the present invention in block form.

FIG. 1 illustrates an embodiment of the present invention in a block diagram. A sample beam 10 comprises a coherent laser beam, which includes directed electromagnetic radiation traveling in phase. The sample beam 10 may be the main laser beam in a given configuration or process, or it may be a low power beam diverted form the main beam. In any event, the beam that is analyzed by the present invention will be termed the sample beam 10, as illustrated in FIG. 1. Often, the sample beam 10 will have a power that is a small fraction of the power of the main beam.

The sample beam 10 is applied to a lateral shearing interferometer 12(a shear plate), which forms an interference pattern 14. An example of several interference patterns 14 are illustrated in FIG. 2. The interference pattern 14 comprises a series of lines such as lines 15 (or fringes) that are substantially parallel. In the invention, the interference pattern 14 in FIG. 1 is imaged on a spatial light modulator (SLM) 16, such as a conventional Liquid Crystal Light Valve (LCLV). The SLM 16 in turn imprints (or modulates) the interference pattern 14 on a second coherent laser beam 18 in a conventional manner. Such imaging by the SLM 16 may comprise modulating the intensity or phase of the second coherent laser beam 18. The second laser beam 18, with the image of the interference pattern 14 impressed on it, is processed through a lens 20, to produce the far-field (Fraunhofer) diffraction pattern 22 of the interference pattern 14. An example of the far-field diffraction pattern 22 that is produced from an interference pattern 14 is illustrated in FIG. 3. The far-field diffraction pattern 22 is the spatial Fourier Transform of the interference pattern 14. The spatial Fourier Transform includes highly accurate information indicative of radius of curvature of the sample beam 10 that produced the interference pattern 14. The diffraction pattern 22 can be imaged onto a video camera 24, or other means for observing the diffraction pattern 22. The video camera 24 may comprise a standard CCD array integral therein. The video camera 24 may be connected to a computer 26, which monitors the pattern 22 in real time. The computer 26 includes a video processor for processing the data from the video camera 24. The video processor may be physically separate or integral with the computer 26.

Figure 3A:
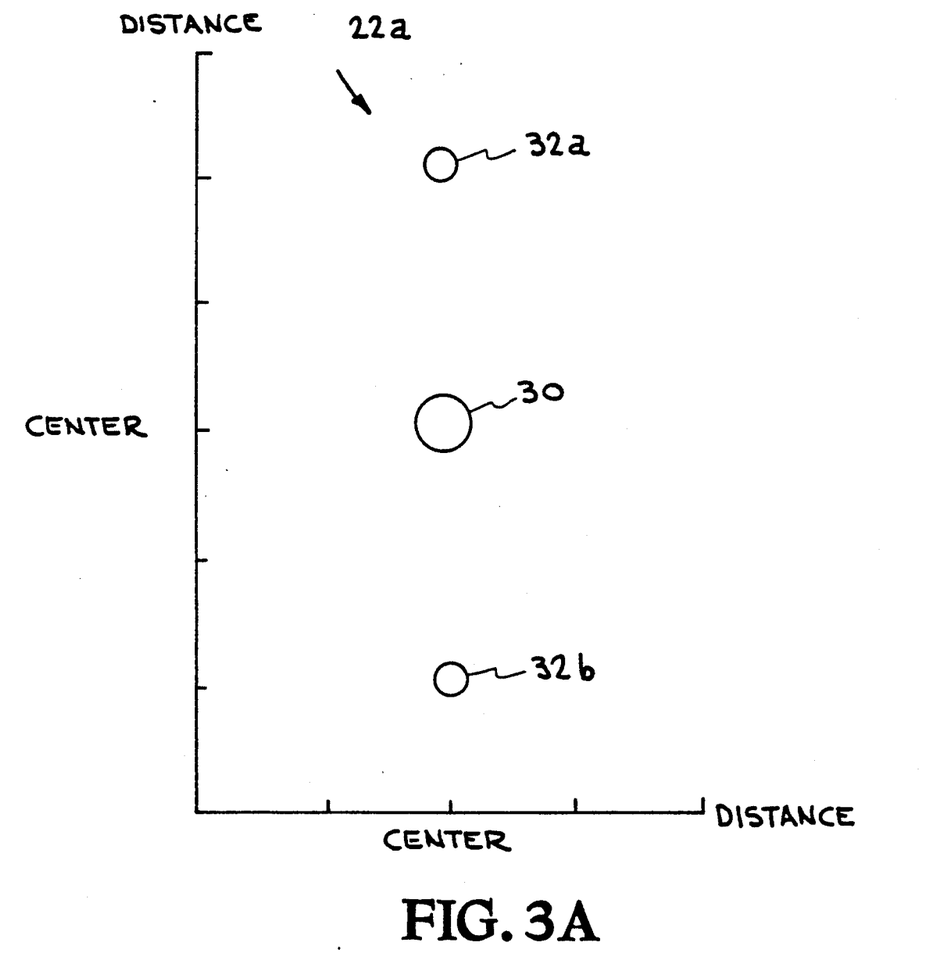
FIGS. 3A, 3B and 3C illustrate several examples of the far-field diffraction pattern produced by the present invention.

The far-field pattern 22a in FIG. 3A includes a bright central lobe 30 and number of lobes positioned around the central lobe 30. For illustration purposes, only the first order lobes 32a, 32b are shown, but an actual far-field pattern will comprise a number of other lobes positioned around the central lobe 30. In the present invention, monitoring the position of the first order lobes 32 with respect to the central lobe 30 provides data pertinent to the wavefront curvature of the sample beam 10, as will be described subsequently.

SPECIFIC DESCRIPTION

The sample beam 10 may be produced by any of a number of sources of coherent laser radiation. Lasers of all types, such as HeNe lasers, excimer lasers, or metal vapor lasers, can produce coherent radiation. Coherence is generally considered to be of two types: spatial coherence and temporal coherence. Spatial coherence refers to the uniformity of a cross-section of the beam. A highly coherent laser beam may exhibit a circular intensity profile that is Gaussian; i.e., the peak intensity is at the center of the circular cross-section, and the intensity drops off uniformly to the sides as a Gaussian curve. In this Gaussian cross-section, the electric fields are substantially in phase. A high degree of spatial coherence can be provided by, for example, a well-controlled laser oscillator, or by spatial filtering. The degree of spatial coherence required of the sample beam 10 is a spatial coherence sufficent to produce an interference pattern 14 that defines a series of fringes. Temporal coherence refers to the variation in the beam over time, and is often measured in terms of length. The sample laser beam 10 is required to have an amount of temporal coherence sufficient to produce an interference pattern with the interferometer that is being used; typically, only a very small coherence length will be required for this purpose.

In many applications, a high power laser beam must be analyzed. The high power laser beam may be used in any of a number of processes, such as laser isotope separation. For these applications, the sample beam 10 may be obtained in a conventional manner, without substantially disrupting the main process laser beam. For example, the sample laser beam 10 may be obtained from the high power beam by conventional optics such as a beamsplitter placed in the high power beam. Another conventional way to obtain the sample beam 10 is through a leak in a mirror positioned in the main beam. Most mirrors are not 100% reflecting; such mirrors are commonly used to direct laser beams. The small amount of transmittance through such a mirror may provide a beam of sufficient power to be usable with the present invention. The portion of the beam that is analyzed by the present invention will be termed the sample beam 10, as illustrated in FIG. 1. Often, the sample beam 10 will have a power that is a small fraction of the power of the main beam.

It is preferable that the sample beam 10 consist of a laser light having substantially a single wavelength. This preference arises because of limitations in many standard interferometers; the pathlength difference would cause a standard interferometer to produce fringes in a position that is a function of the wavelength. In other words, if several distinct wavelengths were propagating in the same beam, for example 600 nm, 700 nm, and 800 nm, then the interference fringes would be positioned differently for each wavelength. This problem would be avoided if the interferometer 12 has zero path difference between legs; in that case, the sample beam 10 may appropriately comprise multiple wavelengths.

Figures 2A, 2B, 2C, 4A:
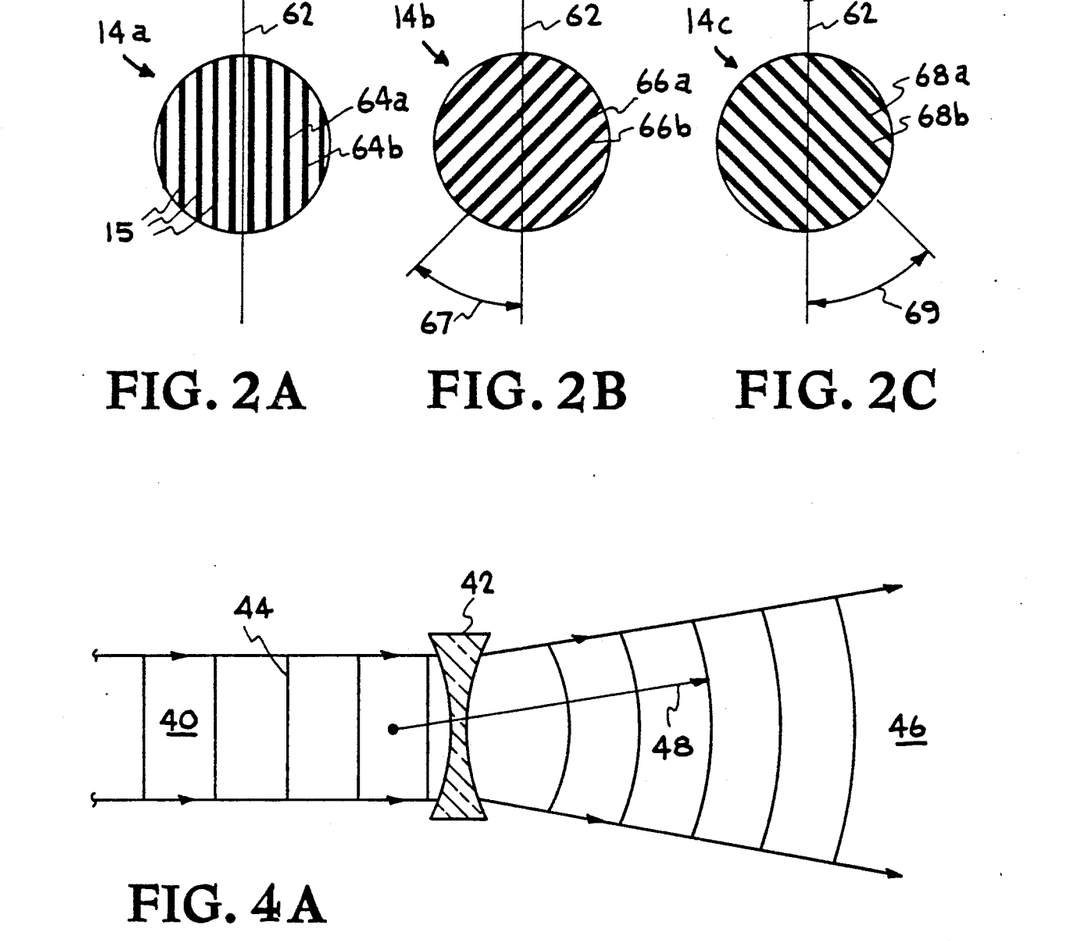
FIGS. 2A, 2B and 2C illustrate several examples of interference patterns produced by a lateral interferometer.
FIGS. 4A and 4B illustrate the radius of curvature of different laser beams, showing a collimated beam, a diverging beam, and a converging beam.

At the interferometer 12, the sample laser beam 10 to be diagnosed may be collimated, or convergent, or divergent. FIG. 4 illustrates differences between a laser beam that is collimated, or convergent, or divergent. In FIG. 4A, a laser beam 40 is collimated by definition because the edges of the beam 40 are travelling in a parallel direction toward the lens 42. The lines connecting the edges of the beam 40, that are drawn perpendicular to its direction of travel, represent the beam's wavefronts. The shape of the wavefronts determine the radius of curvature for any laser beam. In the collimated beam 40, the wavefronts are straight, like the straight line 44. Thus the radius of curvature of the collimated beam 40 is infinite, and it will have only a very small divergence that is determined by its diffraction limit.

Figure 4B:
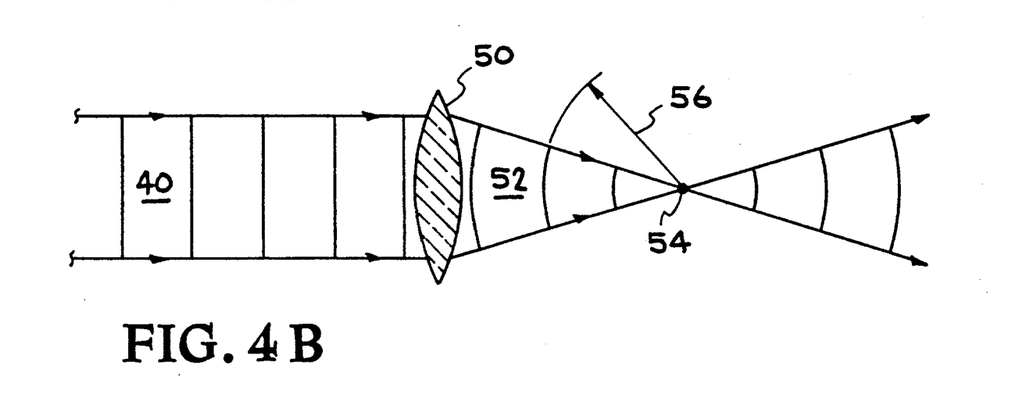

After the beam 40 has traveled through the concave lens 42, it becomes a beam 46 which is divergent. In the divergent beam 46, the beam 46 is spreading out. Its wavefronts are curved, and the beam 46 has a finite radius of curvature 48. By convention, the radius 48 is considered negative, because it is measured against the direction of travel of the beam 46. In FIG. 4B, the collimated beam 40 is passed through a converging lens 50, which produces a beam 52 that is convergent to a focal point 54. In the convergent beam 52, the wavefronts are curved in a direction opposite that of the divergent beam 46. The convergent beam 52 has a finite radius of curvature 56 that is positive by convention. The convergent beam 52 as it travels from the lens 50 will converge to the focal point 54 and then diverge from this focal point 54.

Figure 5:
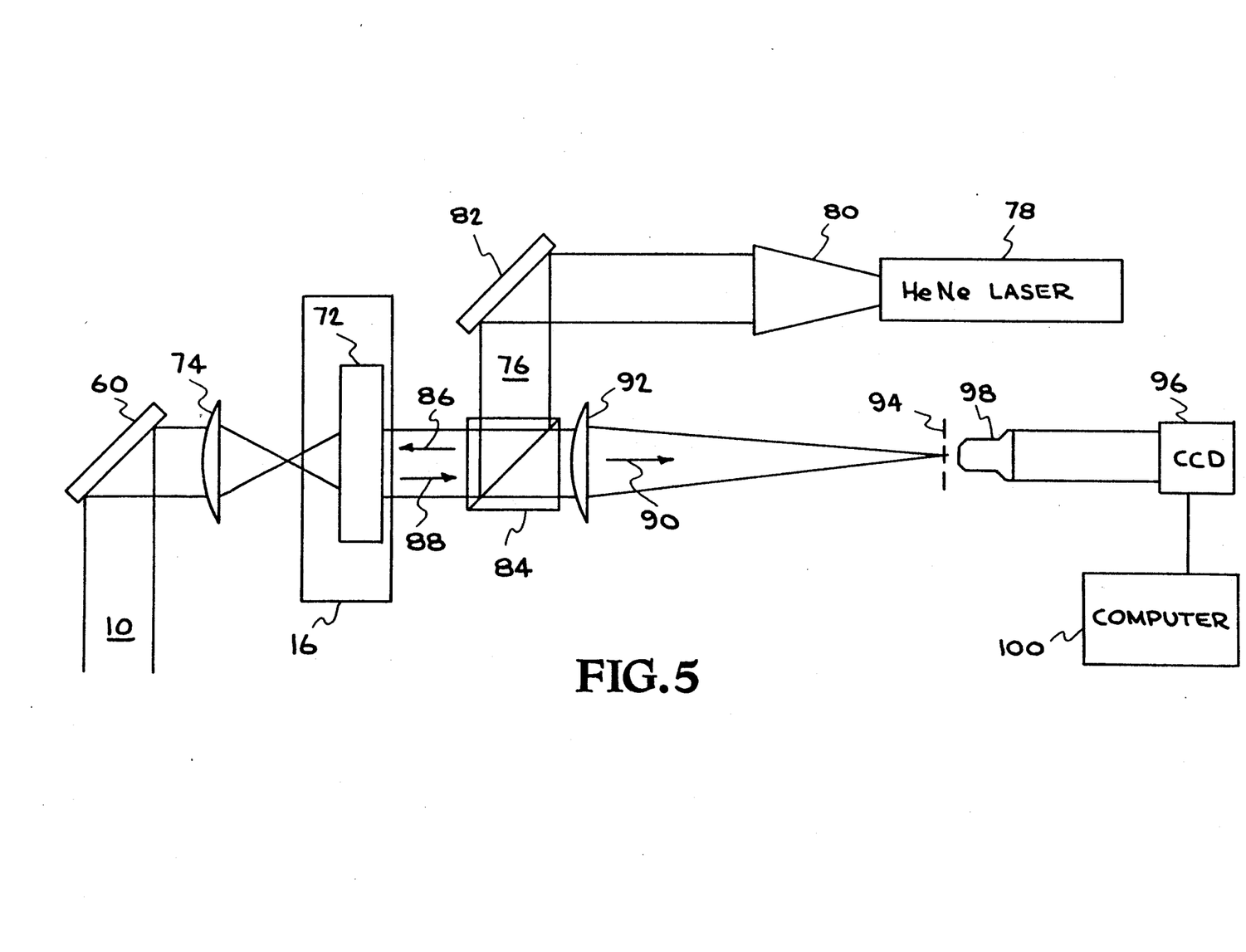
FIG. 5 is a schematic diagram of a preferred embodiment, wherein the spatial light modulator comprises a liquid crystal light valve.

FIG. 5 shows a preferred embodiment of the apparatus of the present invention. The sample beam 10 is applied to the lateral shearing interferometer 12, comprising a conventional shear plate 60. The shear plate 60 has two reflective surfaces which are positioned so that the beam 10 is split into two separate beams and recombined with a slight phase difference, to form an interference pattern 14 comprising a series of lines such as the lines (or fringes) 15. FIG. 2 shows several examples of the interference pattern 14 that may be produced by the present invention. An axis 62 defines a line that is perpendicular to the direction of propagation of the two separate beams produced by the interferometer 60. FIG. 2A illustrates the interference pattern 14a produced when the sample beam 10 is collimated as the beam 40 in FIG. 4, in which case the beam travels in a straight direction, neither diverging nor converging, with wavefronts that are perpendicular to the direction of travel of the beam. The interference pattern 14a of the collimated beam 40 comprises a series of interference fringes 64. such as the fringes 64a, 64b that are parallel to themselves and parallel to the axis 62. FIG. 2B illustrates the interference pattern 14b formed when the sample beam 10 is converging as the beam 52 in FIG. 4B. Interference fringes 66a, 66b are parallel to each other; however, the pattern 14b is illustrated rotated clockwise in an amount of an angle 67 with respect to the axis 62. If the sample beam 10 were only slightly converging, the rotation angle 67 may be very small, less than a degree. FIG. 2C illustrates the interference pattern 14c formed when the sample beam 10 is diverging, as the beam 46 in FIG. 4A. Interference fringes 68a, 68b are parallel to each other; however, the pattern 14c is illustrated rotated counter-clockwise in an amount of an angle 69.

For purposes of the present invention, convergence is associated with one direction of rotation, and divergence with the other direction of rotation. In some embodiments, the interference pattern 14 will rotate as illustrated: in a clockwise direction for convergence, and a counterclockwise direction for divergence. In other embodiments, the interference pattern 14 will rotate counter-clockwise for convergence and clockwise for divergence. Which rotational direction is associated with convergence, and which rotational direction is associated with divergence, is partly dependent upon placement of the shear plate 60 in the beam 10, and therefore the respective associations may vary from embodiment to embodiment.

In FIG. 5, the interference pattern 14 (FIG. 1 and 2) is imaged on the SLM 16, which comprises a conventional Liquid Crystal Light Valve (LCLV) 72. Such LCLVs have been used for image amplifiers for large screen television and projection displays, and for incoherent-to-coherent image converters. For purposes of the present invention, the LCLV 72 is responsive to the intensity of the interference pattern 14. A lens 74 is provided to aid in imaging the interference pattern 14 onto the LCLV 72.

Put simply, the LCLV 72 includes a liquid crystal. The LCLV 72 operates by converting the input light intensity of the interference pattern 14 (the "write" beam) into a voltage which affects the electrooptic properties of the liquid crystal. The change in electrooptic properties means that light passing through the affected liquid crystal is changed in polarization or phase. The output is read by another beam—a read beam 76—passing through the liquid crystal. Thus, the polarization or phase of the read beam 76 is affected by the liquid crystal's birefringence, which is responsive to the intensity of the interference pattern 14.

Reading and writing using the LCLV 72 is conventional. The read beam 76 is provided by a conventional HeNe laser 78, although any of a number of other conventional lasers may be utilized. The laser output from the laser 78 is first increased in width by a conventional beam expander 80, which provides a collimated beam 76 having a width sufficient to read the output of the LCLV 72. A conventional mirror 82 directs the read beam 76 to a conventional polarizing beamsplitter 84, which reflects a polarized portion of the beam 76 toward the LCLV 72 in the direction shown by the arrow 86. The polarized portion of the read beam 76 is the portion that has a polarization along a single axis. The reflected portion travels into the LCLV 72 in the direction shown by the arrow 86. In the LCLV 72, the image of the interference pattern 14 is encoded on the read beam 76 as a polarization change. The read beam 76 is reflected back by the LCLV 72 in the direction shown by the arrow 88. As the beam 76 again passes through the polarizing beamsplitter 84, the portion of the read beam 76 that has been affected by the polarization change passes straight through in the direction shown by the arrow 90. Thus, after the read beam 76 exits the polarizing beam splitter 84, the image of the interference pattern 14 is modulated in the read beam 76.

The read beam 76, with the image of the interference pattern 14 impressed on it, is then processed by a conventional high quality converging lens 92, to produce the far-field (Fraunhofer) diffraction pattern 22 of the interference pattern 14, illustrated in FIG. 3. The far-field diffraction pattern 22 appears at a far-field plane 94, which is located at the focal plane of the lens 92. Applying the principles of Fourier optical signal processing, the far-field diffraction pattern 22 is the spatial Fourier Transform. In the present invention, the spatial Fourier Transform of the interference pattern 14 includes highly accurate information about the radius of curvature of the sample beam 10 which produced the interference pattern 14. The far-field plane 94 is observed by a conventional CCD 96 and associated optics, such as a microscope objective lens 98 positioned to image the far-field plane 94. A computer 100 with a video processor is connected to the CCD 96 to monitor the pattern 22 in real time.

Figure 3B:
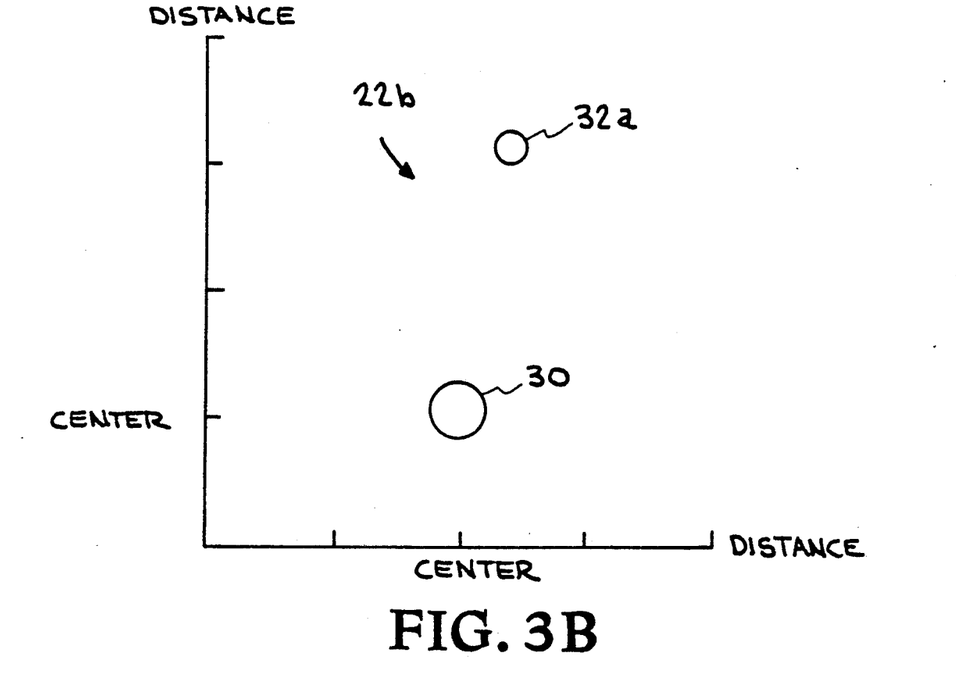
Figure 3C:
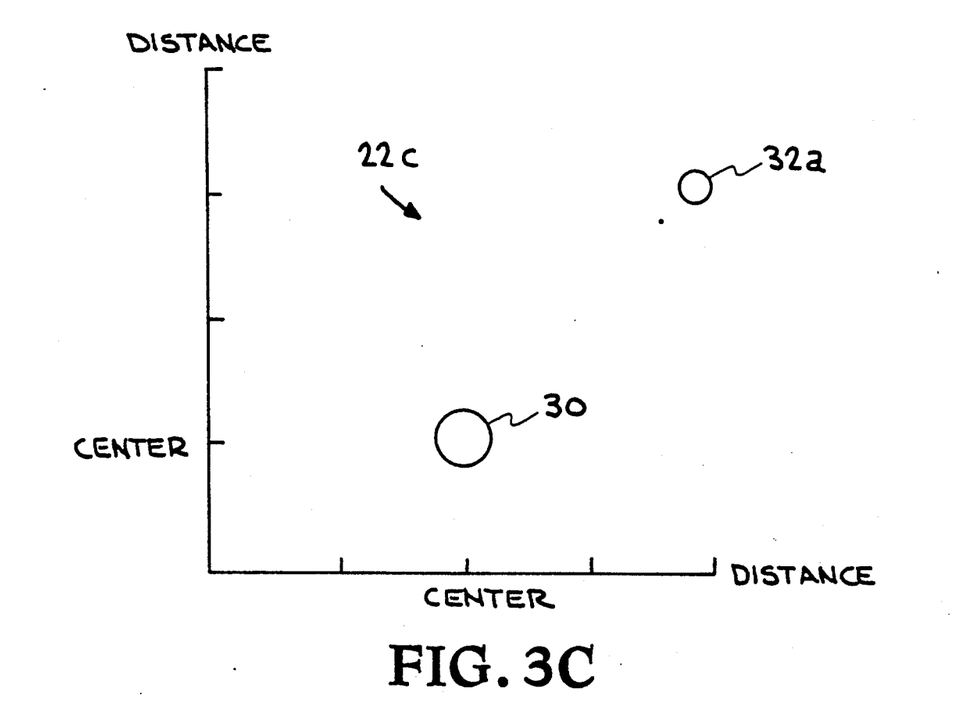

As illustrated in FIG. 3, the far-field diffraction pattern 22 includes a bright central lobe 30 and a number of lobes positioned around the central lobe 30. Of these surrounding lobes, the largest and most intense are two first order lobes 32a, 32b. The position of the first order lobes 32 with respect to the central lobe 30 is an indication of the radius of curvature of the sample beam 10. For example, if the beam 10 is perfectly collimated (i.e., its radius of curvature is $\infty$) then the far-field pattern 22 will show a first order lobe 32a directly above the central lobe 30, as illustrated in FIG. 3a. A beam 10 that is only slightly convergent will cause the first lobe 32a to move horizontally toward one side of the central lobe 30, to produce a diffraction pattern 22b illustrated in FIG. 3B. A larger convergence will cause the first lobe 32a to move even further, to produce a diffraction pattern 22c illustrated in FIG. 3C. If the beam 10 is divergent, similarly the amount of motion of the first lobe 32a is dependent upon the amount of divergence; however, the lobe 32a will move in a direction opposite that caused by a convergent beam 10. Thus, by observing the position of the first lobe 32a with respect to the central lobe 30, the beam 10 can be accurately diagnosed to determine whether it is convergent or divergent, and the extent of convergence or divergence. From this information, the radius of curvature may be calculated. Other lobes of higher orders, such as the second order or third order lobes (not shown) could be monitored for rotation to provide information similar to the first order lobe 32 regarding wavefront curvature. In the present invention, monitoring the first order lobe 32 is preferable because it is brighter than the other (higher order) lobes.

In summary, a preferred embodiment of the present invention illustrated in FIG. 5 comprises the shear plate 60 positioned to analyze the sample beam 10. The interference pattern 14 from the shear plate is imaged by a lens 74 onto a conventional Liquid Crystal Light Valve (LCLV) 72, which responds to the intensity of the image. On the other side of the LCLV 72, a conventional configuration to read the output of the LCLV includes a HeNe laser 78, a beam expander 80, and a polarizing beamsplitter 84. After exiting the LCLV 72 and the polarizing beamsplitter 84, the read beam 76 is focused by the lens 92 to the far-field plane 94. A CCD 96 monitors the far-field plane 94 and provides real time electrical signals indicative of the image. The image in the far-field 94 plane is the Fourier transform of the interference pattern 14, which provides important information pertinent to collimation of the sample beam 10.

Figure 6:
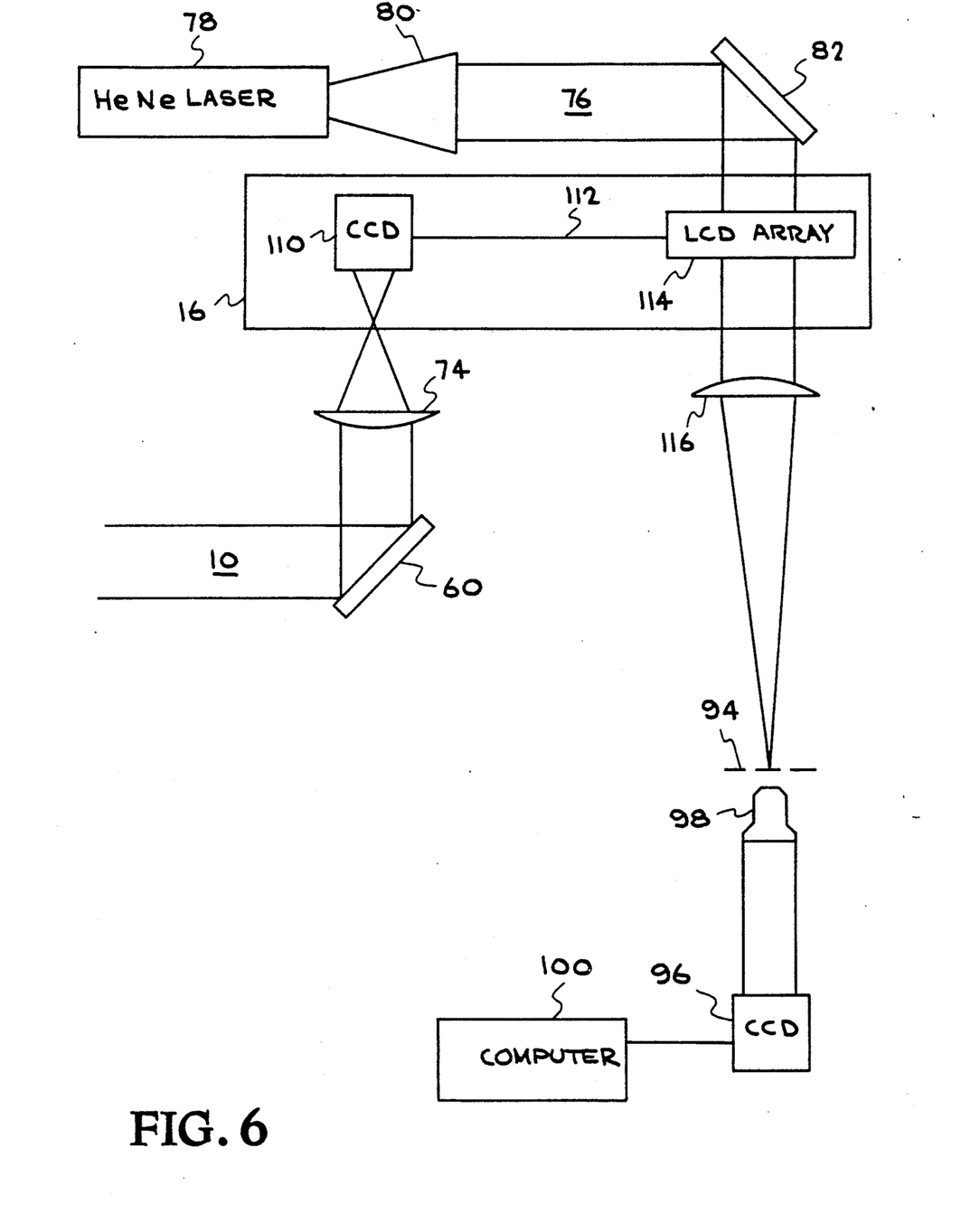
FIG. 6 is a schematic diagram of a preferred embodiment, wherein the spatial light modulator comprises a liquid crystal window.

Another preferred embodiment, illustrated in FIG. 6, uses some components similar to the embodiment illustrated in FIG. 5. The sample beam 10 is applied to the shear plate 60 which provides the interference pattern 14 illustrated in FIG. 2. The interference pattern 14 is imaged by a lens 74. However, in FIG. 6, the interference pattern is imaged to the focal plane of a CCD 110 in any appropriate video camera. A video line 112 electrically connects the CCD 110 to a conventional LCD array 114. The LCD array 114 is like those used for LCD television displays, comprising a screen electrically addressed by pixels. The LCD array 114 operates by changing the rotation of the liquid crystal, which affects the polarization and phase of light passing through it. As in the embodiment described in FIG. 5, a read beam 76 is provided by a conventional HeNe laser 78, although any of a number of conventional lasers may be used. The read beam 76 is widened by a beam expander 80 to a size sufficient to read the image of the interference pattern 14 which is presented in the LCD array 14. A mirror 82 directs the read beam 76 to the LCD array 114. As the read beam 76 passes through the LCD array 114, an image of the interference pattern 14 is impressed thereon. The read beam 76 is then applied to a lens 116, which focuses the beam 76 on the far-field plane 94. The CCD 96 monitors the far-field plane 94 by conventional optics such as the microscope objective 98. The CCD 96 has a contrast adjustment, which is adjusted to optimize the height of the first-order spots 32 in the focal plane with respect to the central lobe 30 (FIG. 3). The electrical signal from the CCD 96 can then be provided to a computer 100 with a video processor, or other means for monitoring the signal. Analysis of the far-field diffraction pattern 14 would proceed in a similar fashion to that explained with reference to FIGS. 2 and 5. Using this information, the radius of curvature may be calculated.

As an alternative to the CCD 96, a lateral effect diode (not shown) may be used to detect the position of the lobes 30,32. If a lateral effect diode is used, the far-field diffraction pattern is focused on the lateral effect diode, which outputs an analog voltage that varies dependent upon the location of the incident light. This voltage may be monitored by any conventional means to provide the location of the lobes 30,32.

In comparing the embodiments of FIGS. 5 AND 6, FIG. 6 may have an advantage in lower cost and relative simplicity. However, the embodiment of FIG. 5 may have an advantage in resolution and potential accuracy. A typical LCD array 114 comprises a two-dimensional matrix of pixels, each of which is responsive to an electrical signal from the CCD 110. The resolution of the LCD array 114 is therefore limited by the number of pixels in the array 114. The LCLV 72 is not based on pixels, but on the direct intensity, and therefore provides very high resolution. However, the limited resolution of the LCD array 114 is not a large problem because in the far-field plane 94, the high frequency components produced by the pixel variations are spatially removed from the central lobe 30 and the first lobes 32. In other words, the positions of the central lobe 30 and the first lobes 32 are substantially unaffected by the high spatial frequency components of the pixels in the array 114, and beam diagnostics using the image produced in the LCD array 114 is accurate and reliable.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

I claim:

1. A diagnostic device for a laser beam, said device comprising:
    a lateral shearing interferometer positioned in the path of the laser beam to be diagnosed, in a position so that an interference pattern of the laser beam is formed;
    a spatial light modulator having an input that comprises said interference pattern;
    a laser providing a beam for reading the output of the spatial light modulator;
    a means for producing the far-field diffraction pattern of the modulated read beam; and
    a means for monitoring said far-field diffraction pattern.

2. The diagnostic device as claimed in claim 1, wherein the lateral shearing interferometer comprises a shear plate.

3. The diagnostic device as claimed in claim 1, wherein the spatial light modulator comprises a liquid crystal light valve, positioned so that the interference pattern is imaged on the input surface of the liquid crystal light valve.

4. The diagnostic device as claimed in claim 1, wherein the spatial light modulator comprises a video camera electrically connected to a liquid crystal display, the video camera being positioned so that said interference pattern is monitored by a video camera, and the liquid crystal display being positioned in the read beam so that the image of the interference pattern is impressed on the read beam.

5. The diagnostic device as claimed in claim 1, wherein the means for producing the far-field diffraction pattern comprises a lens positioned so that the read beam is focused by the lens to provide the far-field diffraction pattern at a focal plane.

6. The diagnostic device as claimed in claim 1, wherein the means for monitoring said far-field diffraction pattern comprises a video camera focused on said far-field diffraction pattern.

7. The diagnostic device as claimed in claim 6, further comprising a computer electrically connected to the video camera so that the image viewed by the video camera is provided to the computer for analysis.

8. A method for diagnosing a laser beam, comprising:
    (a) applying the laser beam to a lateral shearing interferometer to produce an interference pattern;
    (b) applying the interference pattern to a spatial light modulator which provides a modulated output beam;
    (c) producing the far-field diffraction pattern of the output beam of the spatial light modulator; and,
    (d) monitoring the far-field diffraction pattern.

9. The method as claimed in claim 8, comprising a further step (e) analyzing the far-field diffraction pattern to ascertain the relative positions of the central lobe and the first lobe.

10. The method as claimed in claim 8, wherein in the step (d), the far-field diffraction pattern is monitored to analyze the wavefront curvature of the beam.

11. The method as claimed in claim 10, wherein in the step (d), the far-field diffraction pattern is monitored by a CCD array which is electrically connected to a computer, which analyzes the wavefront curvature of the beam.

12. The method as claimed in claim 8, wherein in the step (a) the interference pattern is formed by passing the laser beam through a shear plate.

13. The method as claimed in claim 8, wherein in the step (b), the interference pattern is imaged on a liquid crystal light valve.

14. The method as claimed in claim 13, wherein in the step (c), the output beam is focused by a lens to provide the far-field diffraction pattern at a focal plane.

15. The method as claimed in claim 8, wherein in the step (b), the interference pattern is monitored by a video camera.

16. The method as claimed in claim 15, wherein in the step (b), the output of the video camera is applied to a liquid crystal display.

17. The method as claimed in claim 16, wherein in the step (b), a coherent read beam is applied through the liquid crystal to provide the modulated output beam.

18. The method as claimed in claim 17, wherein in the step (c), the read beam is focused by a lens to provide the far-field diffraction pattern at a focal plane.

19. A method for measuring the curvature of a main laser beam, comprising:
    (a) providing a sample laser beam that is representative of the main beam;
    (b) applying the sample laser beam to a lateral shearing interferometer to produce an interference pattern of the sample laser beam;
    (c) applying said interference pattern to a spatial light modulator, which provides an output comprising a coherent read beam that has the interference pattern modulated in it;
    (d) applying the read beam to a lens to produce the far-field diffraction pattern of the output of the spatial light modulator; and,
    (e) monitoring the far-field diffraction pattern with a video camera.

20. The method as claimed in claim 19, further comprising a step (f) wherein the output of the video camera is provided to a computer which analyzes the relative positions of a central lobe and a first lobe in the far-field diffraction pattern, in order to provide an indication of the radius of curvature of the sample beam.

* * * * *